Figure 1:
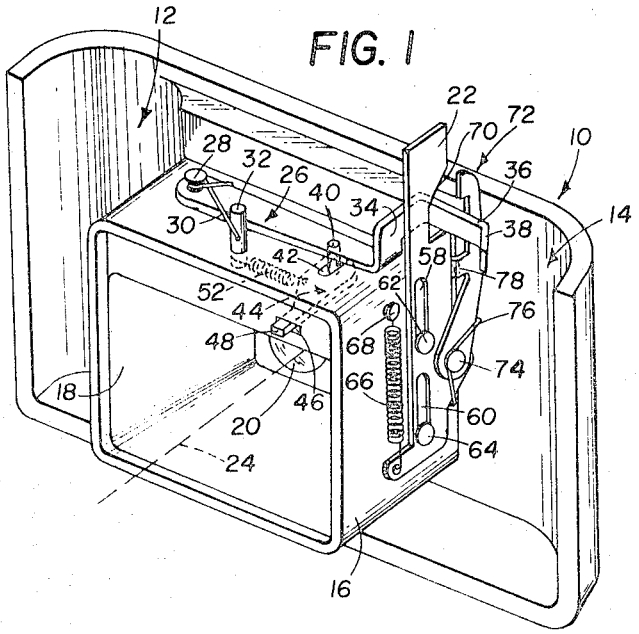
Figure 2:
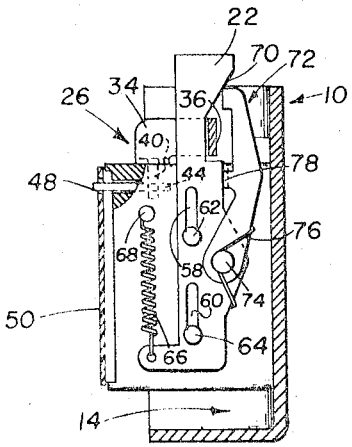
Figure 3:
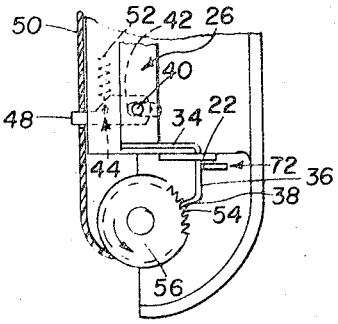
Figure 4:
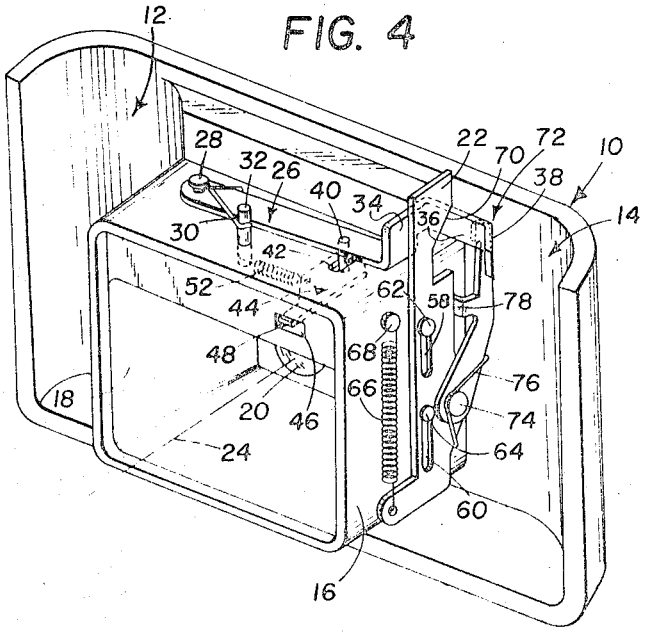
Figure 5:
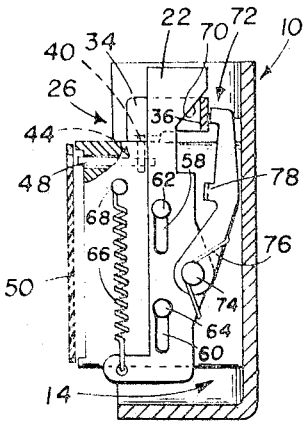
Figure 6:
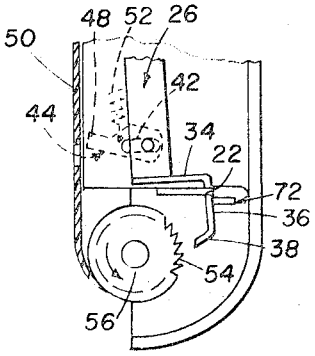
Figure 7:
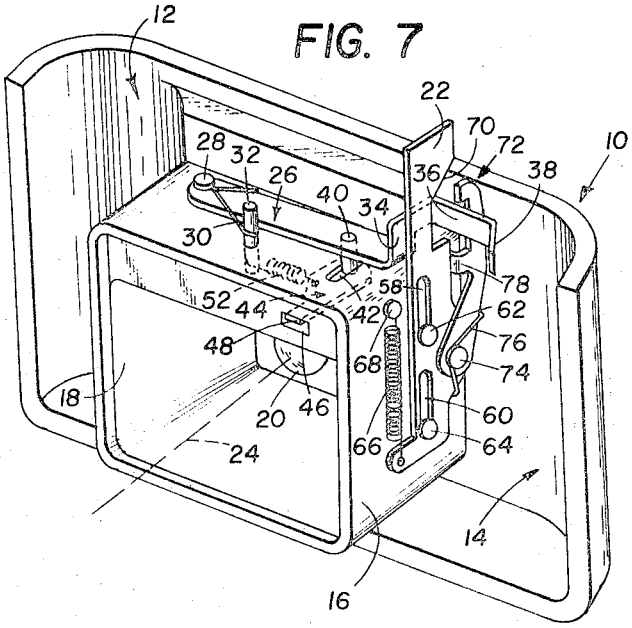
Figure 8:
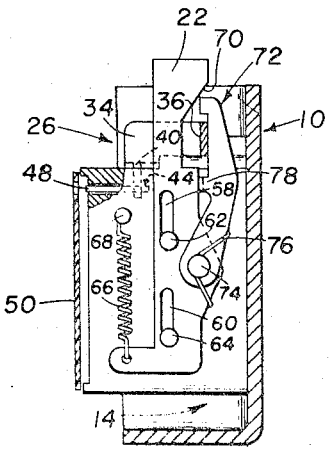
Figure 9:
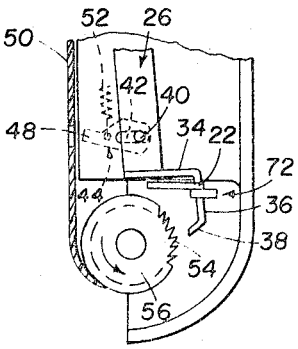

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 8

T883,003
CAMERA WITH FILM METERING AND DOUBLE EXPOSURE PREVENTION MECHANISM

Hubert Nerwin, 901 Elmgrove Road, Rochester, N.Y. 14650

Filed Aug. 22, 1969, Ser. No. 852,405
**Int. Cl. G03b *1/62***
U.S. Cl. 95—31
3 Sheets Drawing, 8 Pages Specification

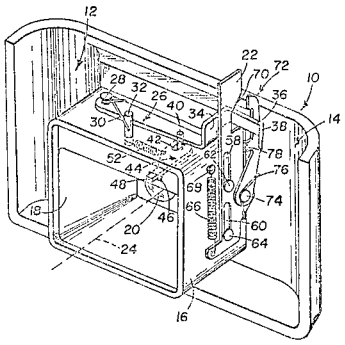

A camera is described having a film metering and double exposure prevention mechanism. The camera is adapted to receive roll film having a plurality of exposure areas and a series of perforations for locating the exposure areas. A film advance mechanism includes a film drive member to which is coupled a ratchet wheel. A pawl is carried by a pivoted lever and is movable into and out of locking engagement with the ratchet wheel to selectively prevent film advance. The lever is biased toward its film advance locking position, but is normally held away from that position by contact between a film sensing finger and film in the camera. The lever is released to move the pawl into locking engagement with the ratchet wheel when a perforation in the film aligns with the finger. The lever extends under a cam surface on a shutter release member so that upon depression of the shutter release member the pawl is moved from engagement with the ratchet and the finger is withdrawn from the perforation to permit film advance until the next perforation aligns with the finger. Double exposure is prevented by a latch member pivotally connected to the shutter release member. The latch member is positioned to overlie the lever when the lever is positioned to permit film advance, thereby preventing depression of the shutter release member. When the film advance mechanism is locked, the latch member clears the lever during shutter release member movement to permit the taking of a picture.

Feb. 2, 1971 H. NERWIN T883,003

CAMERA WITH FILM METERING AND DOUBLE EXPOSURE PREVENTION MECHANISM

Filed Aug. 22, 1969 3 Sheets-Sheet 1

HUBERT NERWIN
INVENTOR.

BY Milton S. Sales
Robert W. Hampton
ATTORNEYS

HUBERT NERWIN
INVENTOR.

BY Milton S. Sales
Robert W. Hampton
ATTORNEYS

Feb. 2, 1971 H. NERWIN T883,003

CAMERA WITH FILM METERING AND DOUBLE EXPOSURE PREVENTION MECHANISM

Filed Aug. 22, 1969 3 Sheets-Sheet 3

HUBERT NERWIN
INVENTOR.

BY Milton S. Sales
Robert W. Hampton
ATTORNEYS